United States Patent [19]

Steinman

[11] 3,988,850

[45] Nov. 2, 1976

[54] FISHING LINE TENSIONER AND TACKLE HOLDER

[76] Inventor: Richard K. Steinman, 507 E. Maryland, Phoenix, Ariz. 85012

[22] Filed: Oct. 6, 1975

[21] Appl. No.: 619,564

[52] U.S. Cl. .............................. 43/25.2; 24/115 H
[51] Int. Cl.² ..................................... A01K 87/00
[58] Field of Search .............. 43/25.2, 25; 24/115 H

[56] References Cited
UNITED STATES PATENTS

| | | | |
|---|---|---|---|
| 1,626,334 | 4/1927 | Falk | 24/115 H X |
| 2,572,889 | 10/1951 | Strykower | 24/115 H X |
| 3,397,026 | 8/1968 | Spina | 24/115 H X |

Primary Examiner—Louis G. Mancene
Assistant Examiner—Daniel J. Leach
Attorney, Agent, or Firm—Drummond, Nelson & Ptak

[57] ABSTRACT

A ferrule encircles a continuous elastic band to form two loops therein. One of the loops is received about a fishing pole. The other loop engages tackle at the end of the fishing line. Tension exerted by the elastic band holds the line tautly.

4 Claims, 6 Drawing Figures

U.S. Patent    Nov. 2, 1976    3,988,850
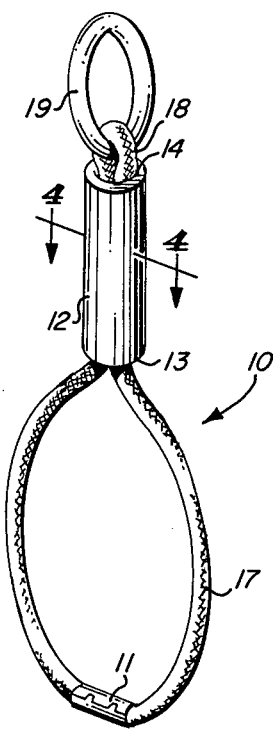
FIG-1
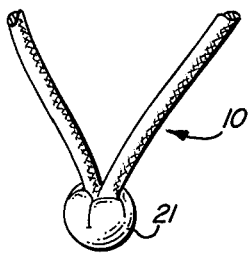
FIG-2
FIG-3
FIG-4
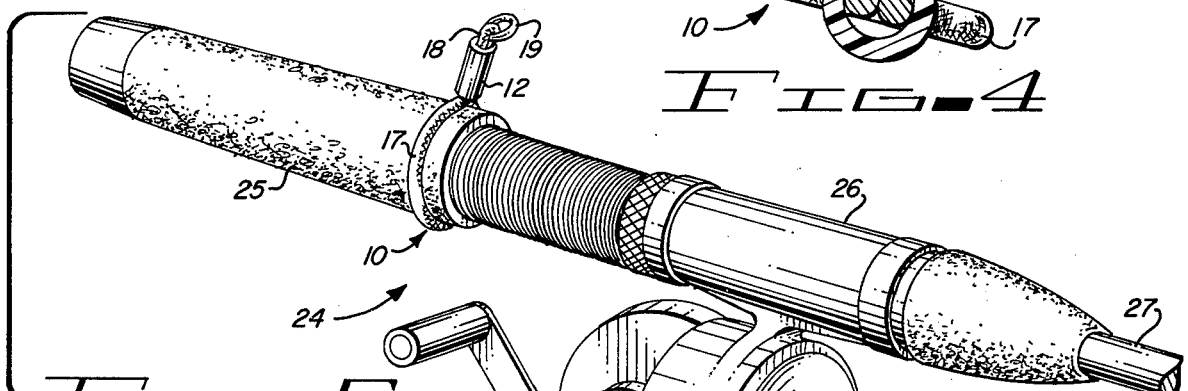
FIG-5
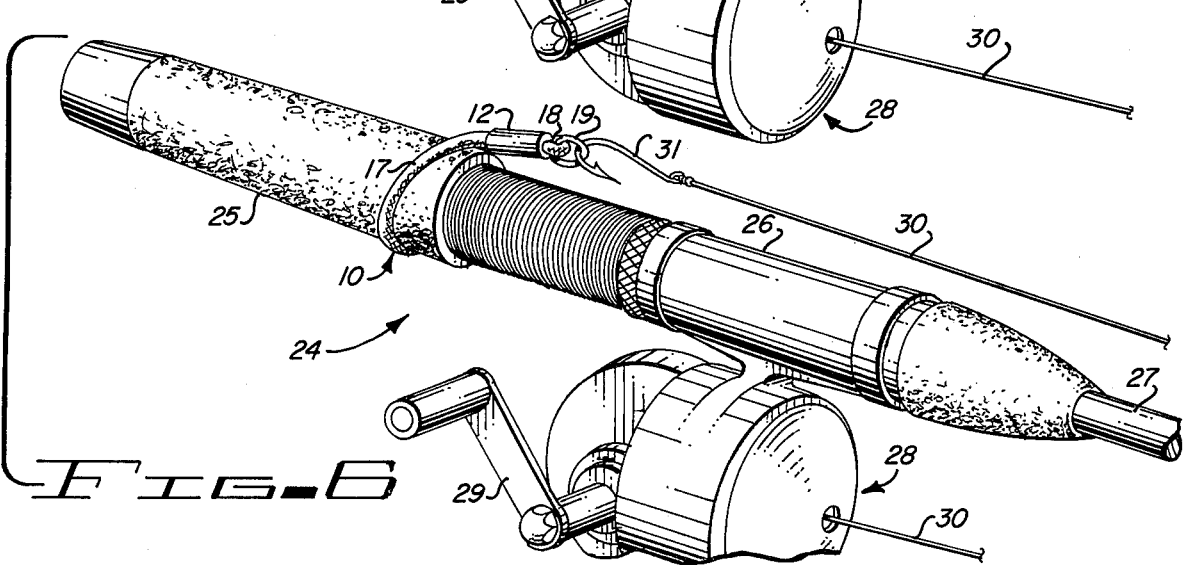
FIG-6

FISHING LINE TENSIONER AND TACKLE HOLDER

This invention relates to fishing tackle.

More particularly the present invention relates to attachments for fishing poles.

In a further aspect the instant invention concerns an accessory item for holding fishing hooks, lures or other tackle and maintaining tension upon the fishing line for orderly storage.

Commonly, fishermen store and transport fishing poles complete with reel, line and hook or other tackle attached to the end of the line. If left to dangle freely, the line becomes entangled with other objects in the environment. This is particularly pronounced, much to the consternation of the fisherman, when two fishing poles are placed side-by-side as is frequently encountered during temporary storage in vehicles or boats, and each line becomes entwined about the other line and both poles. A safety hazard is also presented by the unsecured hook.

In view of the foregoing situation, some manufacturers of fishing equipment have added a hook holder to certain models of fishing rods. The hook holder is in the form of a small wire loop stationarily protruding from the rod usually immediately in front of the area to which the reel is attached. After the hook is engaged with the loop the reel is wound until the pole is slightly flexed thereby exerting tension upon the fishing line for maintaining the hook in securement with the loop. When utilizing a pole without hook attaching means fishermen are disposed to stick the sharpened point of the hook into the end of the handle and employ the foregoing technique for maintaining the arrangement. The results achieved by either procedure are largely unsatisfactory for various reasons. It is immediately apparent, for example, that slight additional flexing of the pole will allow the hook to move the fraction of an inch necessary to become disengaged.

The prior art is replete with various devices which purportedly alleviate the foregoing problem. As a very elementary solution one prior art proposal is simply a soft block in which the point of a hook may be embedded which is secured to the handle of the fishing pole. Other devices attached to the fishing pole have jaw-like clamps for holding the lure or hollow tubes into which the hook is placed. Further devices become even more complex and include such features as protective shields which are disposed about the hook. While certain of the prior art devices are effective in holding a lure and maintaining tension of a fishing line, the structures are cumbersome and have achieved relatively little commercial significance.

It would be highly advantageous, therefore, to provide a simple yet effective fishing tackle accessory for alleviating the long standing fishermen's problem as set forth above.

Accordingly, it is a principal object of the present invention to provide a fishing tackle accessory which is detachably secureable to a fishing pole for keeping the fishing line from becoming entangled during transportation and storage.

Another object of the present invention is to provide a fishing tackle accessory which is readily engageable with an item of fishing tackle at the end of the fishing line.

Still another object of the present invention is to provide a fishing tackle accessory for maintaining a fishing line in doubled arrangement with a fishing pole and for maintaining a predetermined tension upon the fishing line.

Yet another object of the present invention is the provision of a fishing tackle accessory which when engaged with a fishing pole will not interfere with the fishing operation.

And yet another object of the present invention is to provide a fishing tackle accessory which is secureable to various sizes and shapes of fishing poles.

A further object of the instant invention is the provision of a fishing tackle holder which is readily and conveniently engageable with different items of fishing tackle such as lures, snaps and hooks.

And a still further object of the present invention is to provide a device of the above character which is relatively simple and economical to manufacture.

Briefly, to achieve the desires objectives of the present invention in accordance with a preferred embodiment thereof first provided is a continuous elastic band which is encircled by a ferrule to form two loops therein, one at either end of the ferrule. One of the loops is circumferentially engaged about the pole while an item of fishing tackle at the end of the fishing line is engaged with the other loop. The elasticity of the band retains the device at a preselected position on the pole and concurrently exerts tension upon the fishing line. In a further embodiment a rigid eye element for engaging the item of fishing tackle is secured to the fishing tackle holding loop.

The foregoing and further and more specific objects and advantages of the present invention will become more readily apparent to those skilled in the art from the following detailed description of the preferred embodiments thereof taken in conjunction with the drawings in which:

FIG. 1 is a perspective view of the fishing line tensioner and tackle holder constructed in accordance with the teachings of the present invention;

FIG. 2 is a partial perspective view of the lower end of the device of FIG. 1 and specifically illustrating an alternate means of providing a continuous elastic band;

FIG. 3 is a perspective view corresponding to the view of FIG. 2 and illustrating yet another means of providing a continuous elastic band;

FIG. 4 is a horizontal, sectional view taken along the line 4—4 of FIG. 1 and further detailing a preferred arrangement of components thereof;

FIG. 5 is a partial, perspective view of a conventional fishing pole having the fishing tackle accessory of the instant invention engaged therewith; and FIG. 6 is a partial, perspective view of a fishing pole corresponding to the illustration of FIG. 5 and especially showing the fishing tackle accessory of the instant invention as it would appear during use for holding an item of fishing tackle and applying tension to the fishing line.

Turning now to the drawings in which the same reference numerals indicate corresponding elements throughout the several views, attention is first directed to FIG. 1 which shows a preferred embodiment of the instant invention having a continuous elastic band generally designated by the reference character 10. Continuous elastic band 10, as will be apparent to those skilled in the art, is a length of stretchable material the ends of which have been secured by a collar 11 crimped or swedged thereto. Ferrule 12 having first and second ends 13 and 14, respectively, encircles elastic band 10 to form first loop 17 and second loop 18 therein adjacent first and second ends, respectively, of ferrule 12. A rigid eye 19 is engaged with second loop 18. Manufacture is simply achieved by passing band 10 through eye 19 prior to passing through ferrule 12 and being closed by collar 11.

FIG. 2 shows an alternate technique for securing the ends of elastic band 10. The ends are overlapped, as opposed to the abutting arrangement illustrated in FIG. 1, and secured with a collar 20 generally similar to collar 11. As illustrated in FIG. 3 the ends of band 10 are placed in side-to-side arrangement and inserted into ball element 21 which is then crimped to secure the ends. Ball elements 21 are well known in the art and are generally formed of thin metal such as aluminum, brass or stainless steel. Collars 11 and 20 are also usually thin metal elements. In accordance with other manufacturing techniques the closure can be effected by a plastic element.

As seen in FIG. 4 ferrule 12 is a hollow cylindrical member, preferably fabricated of metal or plastic, through which a doubled portion of continuous band 10 passes. Ferrule 12 snugly receives elastic band 10 to maintain the loops as described in connection with FIG. 1. However, elastic band 10 is slidable within ferrule 12 so that the elasticity or stretching of band 10 will not be inhibited. The unique results obtained by the peculiar arrangement of ferrule 12 and elastic band 10 will become apparent presently.

FIG. 5 graphically illustrates the fishing pole generally designated by the reference character 24 having a handle 25 at the rearward end thereof, a reel holding section 26 and a forwardly extending flexible pole element 27. Fishing reel 28 is secured to reel holding section 26 and includes a handle 29 for retrieving fishing line 30 and wrapping it about a spool element, the latter enclosed within reel 28 and not herein illustrated.

The fishing line tensioner and tackle holder of the instant invention is secured to fishing pole 25 by first loop 17 of continuous elastic band 10 encircling handle 25. Loop 17 is slightly smaller than the diameter of handle 25 to provide a tightly fitting element that will not readily move. As loop 17 is stretched to accommodate handle 25 ferrule 12 moves upwardly against rigid eye 19 to limit the free size of loop 17. Provided, therefore, is a device which is readily and easily engaged or disengaged with the fishing pole yet will not readily shift from the position as predetermined by the fisherman.

Referring now to FIG. 6 an item of fishing tackle is specifically illustrated as hook 31 attached to the free end of fishing line 30 is engaged with eye member 19. Handle 29 of reel 28 is rotated to retrieve line 30 and stretching continuous elastic band 10. As will be appreciated by those familiar with fishing equipment reels are provided with either manual or automatic devices which resist the force of elastic band 10 to remove line 30 from reel 28. The force exerted by elastic band 10 in an attempt to return to the relaxed position is sufficient to keep line 30 taut and maintain the engagement of hook 31 with eye 19. The elastic movement of band 10 is sufficient to compensate for flexures of pole element 27 which would otherwise permit line 30 to become slack. Due to the sliding movement of ferrule 12 the total length of elastic band 10 is available for stretching and exerting a biasing force upon line 30.

Various modifications and alterations in the embodiments of the invention herein chosen for purposes of illustration will readily occur to those skilled in the art. Obviously ferrule 12 may be crimped about band 10 to simultaneously provide two loops and concurrently provide the closure member. It is recognized, however, that this would inhibit the function of the device as hereinbefore described. Similarly, the entire device may be unitarily molded of an elastic material such as latex or neoprene. Further, rigid eye 19 may be a split ring which is subsequently attached thereto.

Having fully described and disclosed the present invention and the preferred embodiments thereof in such clear and concise terms as to enable those skilled in the art to understand and practice the same the invention claimed is:

I claim:

1. A fishing tackle accessory for detachable securement to a fishing pole and for engaging an item of fishing tackle and maintaining tension on the fishing line; said accessory comprising:
  a. a continuous elastic band; and
  b. a ferrule encircling said elastic band to form
     i. a first loop in said elastic band at one end of said ferrule for circumferentially engaging said fishing pole, and
     ii. a second loop in said elastic band at the other end of said ferrule for engaging said item of fishing tackle.

2. The fishing tackle accessory of claim 1, further including tackle engaging means associated with said second loop.

3. The fishing tackle accessory of claim 2, wherein said tackle engaging means comprises a rigid eye element.

4. The fishing tackle accessory of claim 2, wherein said ferrule is slidably disposed about said elastic band.

* * * * *